United States Patent
King-Smith et al.

(10) Patent No.: US 9,952,911 B2
(45) Date of Patent: Apr. 24, 2018

(54) DYNAMICALLY OPTIMIZED DEVICE DRIVER PROTOCOL ASSIST THREADS

(71) Applicant: International Business Machines Corporation, Armonk, NY (US)

(72) Inventors: Bernard A. King-Smith, Lake Katrine, NY (US); Kavitha Vittal Murthy Baratakke, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 15/062,881

(22) Filed: Mar. 7, 2016

(65) Prior Publication Data
US 2017/0255498 A1 Sep. 7, 2017

(51) Int. Cl.
*G06F 9/46* (2006.01)
*G06F 9/50* (2006.01)

(52) U.S. Cl.
CPC .......... *G06F 9/5083* (2013.01); *G06F 9/5027* (2013.01); *G06F 2209/5018* (2013.01)

(58) Field of Classification Search
None
See application file for complete search history.

(56) References Cited

U.S. PATENT DOCUMENTS

| 7,257,633 | B2 | 8/2007 | Masputra et al. |
| 8,387,059 | B2 | 2/2013 | Chang et al. |
| 2005/0086359 | A1* | 4/2005 | Banerjee ............... G06F 9/5027 709/232 |
| 2011/0142064 | A1* | 6/2011 | Dubal ................... H04L 47/122 370/412 |
| 2011/0153935 | A1* | 6/2011 | Li ........................... H04L 45/00 711/118 |
| 2011/0252419 | A1* | 10/2011 | Cardona ............. G06F 9/45558 718/1 |

* cited by examiner

*Primary Examiner* — Dong Kim
(74) *Attorney, Agent, or Firm* — Patterson + Sheridan, LLP

(57) ABSTRACT

Systems, methods, and computer program products to perform an operation comprising providing a plurality of assist threads configured to process data units received by a network adapter, wherein each of the plurality of assist threads comprises a queue configured to store data units allocated to the respective assist thread, allocating data units received by the network adapter to assist threads in a subset of the plurality of assist threads according to a first function, wherein the subset includes a first assist thread and does not include a second assist thread, of the plurality of assist threads, monitoring the queues of the assist threads in the subset, and upon determining that a count of data units in the queue of the first assist thread exceeds a first threshold, modifying the first function to include the second assist thread in the subset of the plurality of assist threads.

20 Claims, 5 Drawing Sheets

DYNAMICALLY OPTIMIZED DEVICE DRIVER PROTOCOL ASSIST THREADS

BACKGROUND

The present disclosure relates to computer software, and more specifically, to dynamically optimized device driver protocol assist threads.

Device drivers enable operating systems to communicate with hardware devices, such as network adapters and other peripherals. Some network adapter device drivers provide protocol stack assist threads that enable multi-processor systems to process data more efficiently. Traditionally, the number of protocol stack assist threads is fixed. However, network traffic typically is erratic and not steady, leading to inefficient system performance due to the number of data packets required to run the protocol stack assist threads efficiently. Providing too many protocol stack assist threads may waste processor cycles or cause high thread overhead, as the threads may have too few data units to process. Additionally, using a fixed number of threads can cause high latency when a burst of traffic arrives.

SUMMARY

Embodiments disclosed herein provide systems, methods, and computer program products to perform an operation comprising providing a plurality of assist threads configured to process data units received by a network adapter, wherein each of the plurality of assist threads comprises a queue configured to store data units allocated to the respective assist thread, allocating data units received by the network adapter to assist threads in a subset of the plurality of assist threads according to a first function, wherein the subset includes a first assist thread and does not include a second assist thread, of the plurality of assist threads, monitoring the queues of the assist threads in the subset, and upon determining that a count of data units in the queue of the first assist thread exceeds a first threshold, modifying the first function to include the second assist thread in the subset of the plurality of assist threads.

DETAILED DESCRIPTION

Embodiments disclosed herein dynamically optimize device driver protocol assist threads (referred to herein as "assist threads") for network adapters based on the current rate of network traffic. Initially, a fixed number of assist threads are provided (and active) for each port of each network adapter in a system. However, only a subset of the assist threads are initially used to process data units (which includes, without limitation, data frames, data packets, data messages, and the like). For example, the device driver may employ a hash function to allocate data units evenly amongst the subset of the assist threads. Each of the assist threads has a respective queue that holds data units waiting to be processed by the assist thread. Embodiments disclosed herein actively monitor the queues of each assist thread. When the number of data units in a queue exceeds a predefined threshold (or the total number of data units across all queues exceeds a threshold), additional active assist threads may be added to the subset of assist threads that are processing data units to accommodate the increase of network traffic. Similarly, when the number of data units in a queue (or across all queues) falls below a threshold (e.g., the system is experiencing low traffic rates), one or more assist threads may be removed from the subset of assist threads.

In at least one embodiment, the hash function is modified to add or remove assist threads from the subset. For example, when assist threads are added to the subset, the hash function may be modified to map to the additional assist threads (in addition to the assist threads in the subset that the hash function previously mapped to). Similarly, when assist threads are removed from the subset, the hash function may be modified to not map to the assist threads that are removed from the subset. Generally, the hash functions are configured to map to (or return) a number of hash values that are based on the current size of the subset of assist threads. For example, if 10 assist threads are currently in the subset of assist threads (and are processing data packets), the hash function may map to 10 different hash values, where each hash value corresponds to a respective assist thread in the subset.

Figure 1:
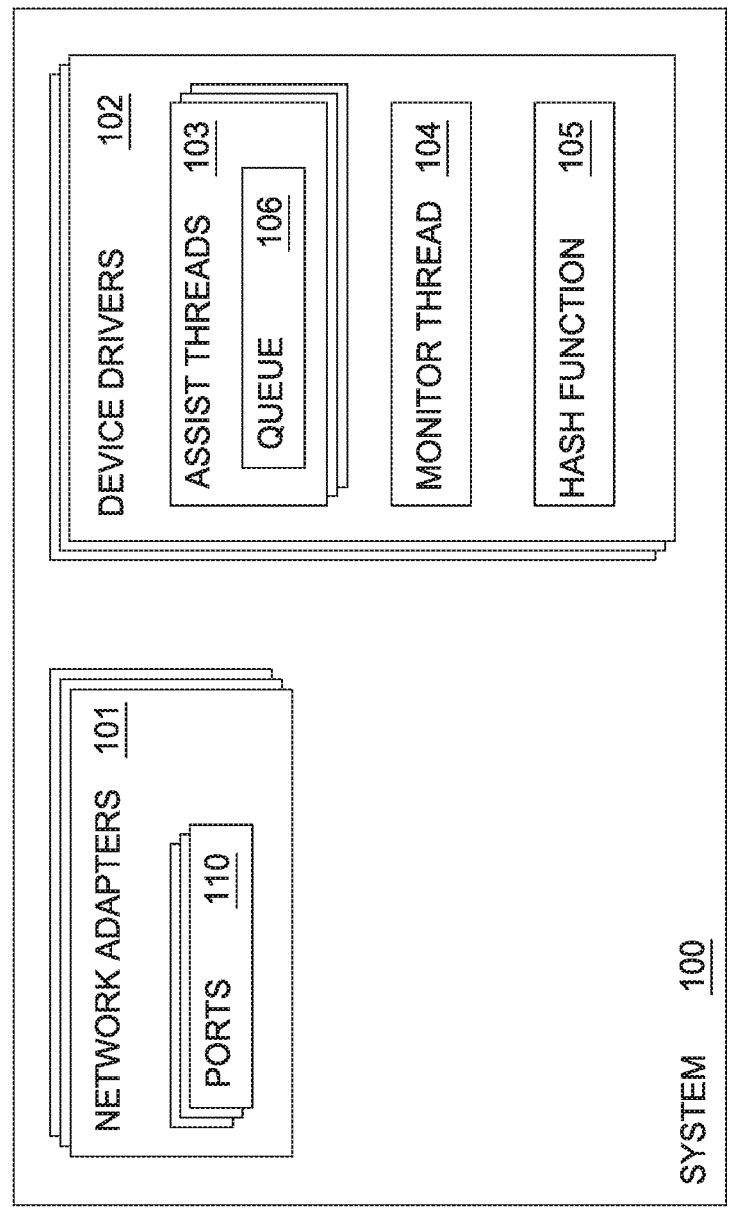
FIG. 1 depicts an example system that provides dynamically optimized device driver protocol assist threads, according to one embodiment.

FIG. 1 depicts a system 100 that provides dynamically optimized device driver protocol assist threads, according to one embodiment. As shown, the system 100 includes a plurality of network adapters 101. The network adapters 101 connect the system 100 to a network (not pictured) via one or more ports 110. The system 100 also includes one or more device drivers 102 that allow components of the system 100 to communicate with the network adapter 101. In at least one embodiment, a device driver 102 is provided for each port 110 of a given network adapter 101. In at least one embodiment, the device drivers 102 are components of an operating system (not pictured) of the system 100.

As shown, each device driver 102 includes a plurality of assist threads 103, a monitor thread 104, and a hash function 105. The assist threads 103 are protocol stack assist threads (such as DOG threads on the AIX operating system) that process data packets received by a receive queue of the network adapter 101 (not pictured). As shown, each assist thread 103 includes a respective queue 106, which stores data units (such as packets, messages, frames, etc.) for processing by the respective assist thread 103. Generally, each time the system 100 starts, each device driver 102 deploys a set number of assist threads 103 that remain active in the system 100 at all times. However, at any given time, only a subset of the active assist threads 103 may actually process data units for the system 100. Generally, each assist thread 103 may execute on any physical or virtual processor in the system 100.

The monitor threads 104 are generally configured to monitor the queues 106 of the assist threads 103 to determine the current rate of network traffic (or the processing performance of one or more assist threads 103). If a monitor thread 104 determines that the total number of data units in a given queue 106 exceeds a threshold, the monitor thread 104 (or the device driver 102) may cause additional assist threads 103 that are active (but not currently processing data units) to begin processing data units. Similarly, the threshold may be for multiple queues 106 that must be exceeded by the sum of data units in the queues 106. For example, the multiple-queue threshold may be met by the queues 106 of each assist thread 103 allocated to each port 110, each network adapter 101, or the entire system 100. Additionally, if the monitor thread 104 determines that the number of data units in a given queue 106 (or across multiple queues 106) falls below a threshold, the monitor thread 104 (or the device driver 102) may quiesce one or more assist threads 103, whereby the quiesced assist threads 103 remain active, but do not process data units for the ports 110 of the network adapter 101. The monitor threads 104 may continuously monitor the sizes of the queues 106, but may modify the subset of assist threads 103 that are currently processing data units according to a predefined timing schedule (such as once per millisecond, once per tens of microseconds, etc.).

The device driver 102 may use the hash function 105 to allocate data units amongst the assist threads 103 that are currently designated to process data units. The hash function 105 may be any suitable hash function which maps data to a number of hash values that equals the number of assist threads 103 currently designated to process data units. In at least one embodiment, a hash function 105 is provided for each port 110 of each network adapter 101, whereby the respective hash function 105 maps to the assist threads 103 currently designated to process data units of the respective port 110 of the network adapter 101. The hash function 105, in only mapping to the assist threads 103 that are currently designated to process data units, is able to distribute data units among such assist threads 103 over time.

In one embodiment, each hash function 105 is based on the total number of assist threads 103 currently designated to process data units for the given port 110. The hash functions 105 may be configured to hash values in the data units received or transmitted by the network adapters 101. For example, the hash functions 105 may hash on the source IP address and a source port number specified in a given data unit divided by the number of assist threads 103 that are currently processing data units. The values returned by the hash function 105 (also known as hash values) may correspond to one of the assist threads 103 that are currently processing data units for a given port 110. Therefore, when adding or removing assist threads 103 from the subset of assist threads that are currently processing data units, the device driver 102 may change the hash function 105 accordingly (e.g., modify the denominator to reflect the current number of assist threads 103 that are currently processing data units).

Figure 2A:
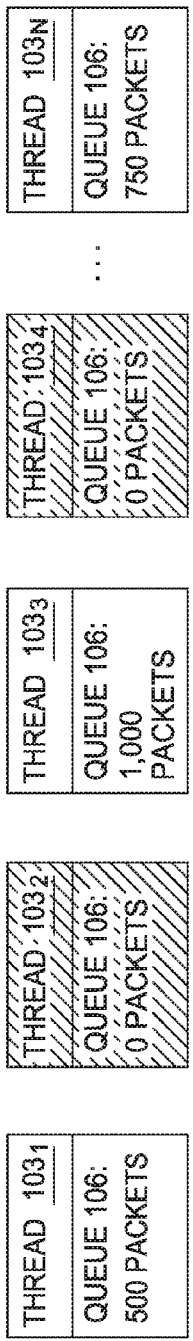
FIGS. 2A-2C depict dynamically optimized device driver protocol assist threads, according to one embodiment.

FIG. 2A depicts dynamically optimized device driver protocol assist threads, according to one embodiment. As shown, FIG. 2A includes five example assist threads $103_{1-N}$, although in any given implementation, more or fewer assist threads 103 may be provided. The assist threads $103_{1-N}$ may be deployed at system startup, and are configured to process packets for a specific port 110 of a network adapter 101. However, as previously indicated, only a subset of the assist threads $103_{1-N}$ depicted in FIG. 2A currently process data units. Specifically, as shown in FIG. 2A, assist threads $103_1$, $103_3$, and $103_N$ are currently processing data packets, while assist threads $103_2$ and $103_4$ are active but not currently processing data packets. For the sake of clarity in FIGS. 2A-2B, the assist threads 103 that are not currently processing data packets are shaded in gray. Therefore, as shown in FIG. 2A, the associated hash function 105 maps to hash values associated with assist threads $103_1$, $103_3$, and $103_N$. Configuring the hash function 105 in such a manner distributes data packets received by the port 110 to the assist threads $103_1$, $103_3$, and $103_N$ over time. Therefore, the hash function 105 may allocate a first data packet received by port 110 to any one of the active assist threads $103_{1-N}$.

As previously indicated, the monitor thread 104 may monitor the queues 106 of the assist threads $103_{1-N}$. As shown, the queues 106 of the assist threads $103_{1-N}$ currently hold 500, 0, 1,000, 0, and 750 packets respectively. Assuming a threshold of 800 packets for a given queue 106, the monitor thread 104 may determine that the queue 106 of assist thread $103_3$ exceeds the threshold, and that one of the assist threads $103_{2-4}$ should begin processing data units to improve system performance. Similarly, if the threshold of 2,000 packets is set across the queues 106 of all assist threads $103_{1-N}$, the monitor thread 104 may determine that the threshold is exceeded, and that additional assist threads 103 are required to process data packets.

Figure 2B:
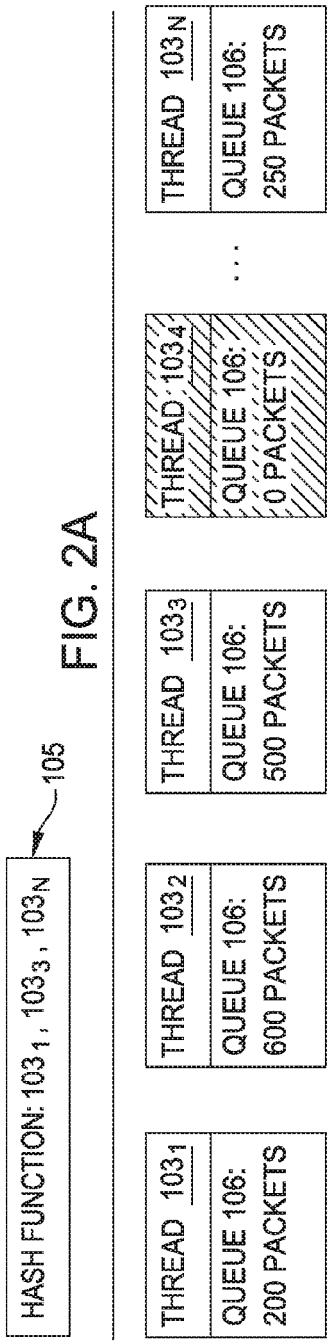

FIG. 2B depicts the assist threads $103_{1-N}$ after the monitor thread 104 has caused assist thread $103_2$ to begin processing data packets. Therefore, in FIG. 2B the subset of assist threads $103_{1-N}$ that are currently processing data packets includes assist threads $103_1$, $103_2$, $103_3$, and $103_N$, and does not include assist thread $103_4$. Accordingly, as shown, the hash function 105 has been modified to map to hash values corresponding to assist threads $103_1$, $103_2$, $103_3$, and $103_N$, but not assist thread $103_4$. While only assist thread $103_2$ was added to the subset from FIG. 2A to FIG. 2B, in another embodiment, the monitor thread 104 may cause multiple assist threads, i.e., the assist threads $103_2$ and $103_4$, to begin processing data packets. The monitor thread 104 may determine the number of assist threads to add to the subset based on any number of factors, including a tiered threshold approach (i.e., where an additional assist thread 103 is added to the subset for each threshold that is exceeded by packets in the queues 106).

As shown in FIG. 2B, enabling assist thread $103_2$ has improved the processing of data packets, as reflected by the queues 106 of each assist thread 103. Specifically, the queues 106 of assist threads $103_1$, $103_2$, $103_3$, and $103_N$ include 200, 600, 500, and 250 packets respectively. At a later point, based on the current sizes of the queues 106, the monitor thread 104 may determine to remove one or more of the assist threads $103_1$, $103_2$, $103_3$, and $103_N$ from the subset of assist threads that are currently processing data packets. The monitor thread 104 may make the determination based on any number of factors. For example, the monitor thread 104 may determine that the previous threshold of 800 packets in a single queue 106 is no longer exceeded (as no single queue 106 has more than 800 packets). Similarly, the monitor thread 104 may determine that the summed threshold of 2,000 packets across all queues 106 is no longer exceeded, as the sum of all queues 106 does not exceed 2,000 packets. Further still, the monitor thread 104 may apply a different threshold for removing an assist thread (for example, if each respective queue 106 has fewer than 700 packets, or the sum of packets in all queues 106 is less than 1,700 packets). When "removing" an assist thread $103_{1-N}$ from the subset, the assist thread $103_{1-N}$ may process all remaining packets in the respective queue 106. However, the hash function 105 will be updated so as to not allocate any further packets to the assist thread $103_{1-N}$ that has been removed from the subset.

Figure 2C:
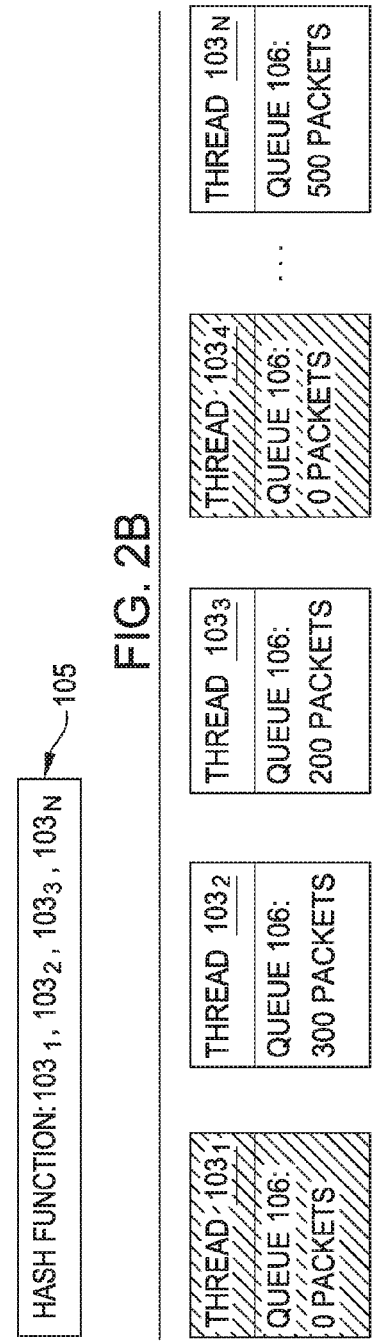

FIG. 2C depicts the scenario where the monitor thread 104 has removed assist thread $103_1$ from the subset of assist threads $103_{1-N}$ that are currently processing data packets. Stated differently, in FIG. 2C, assist thread $103_1$ is not processing data packets, as the traffic rates (as measured by the number of packets in the queues 106) in FIG. 2B permitted the monitor thread 104 to quiesce at least one assist thread $103_{1-N}$. Although only assist thread $103_1$ was quiesced, in some embodiments, more than one assist thread may be quiesced. As shown, therefore, the subset of assist threads $103_{1-N}$ that are currently processing data packets in FIG. 2C includes assist threads $103_2$, $103_3$, and $103_N$, and does not include assist threads $103_1$, $103_4$. Accordingly, as shown, the hash function 105 has been modified to map to hash values corresponding to assist threads $103_2$, $103_3$, and $103_N$, but not assist threads $103_1$, $103_4$.

Figure 3:
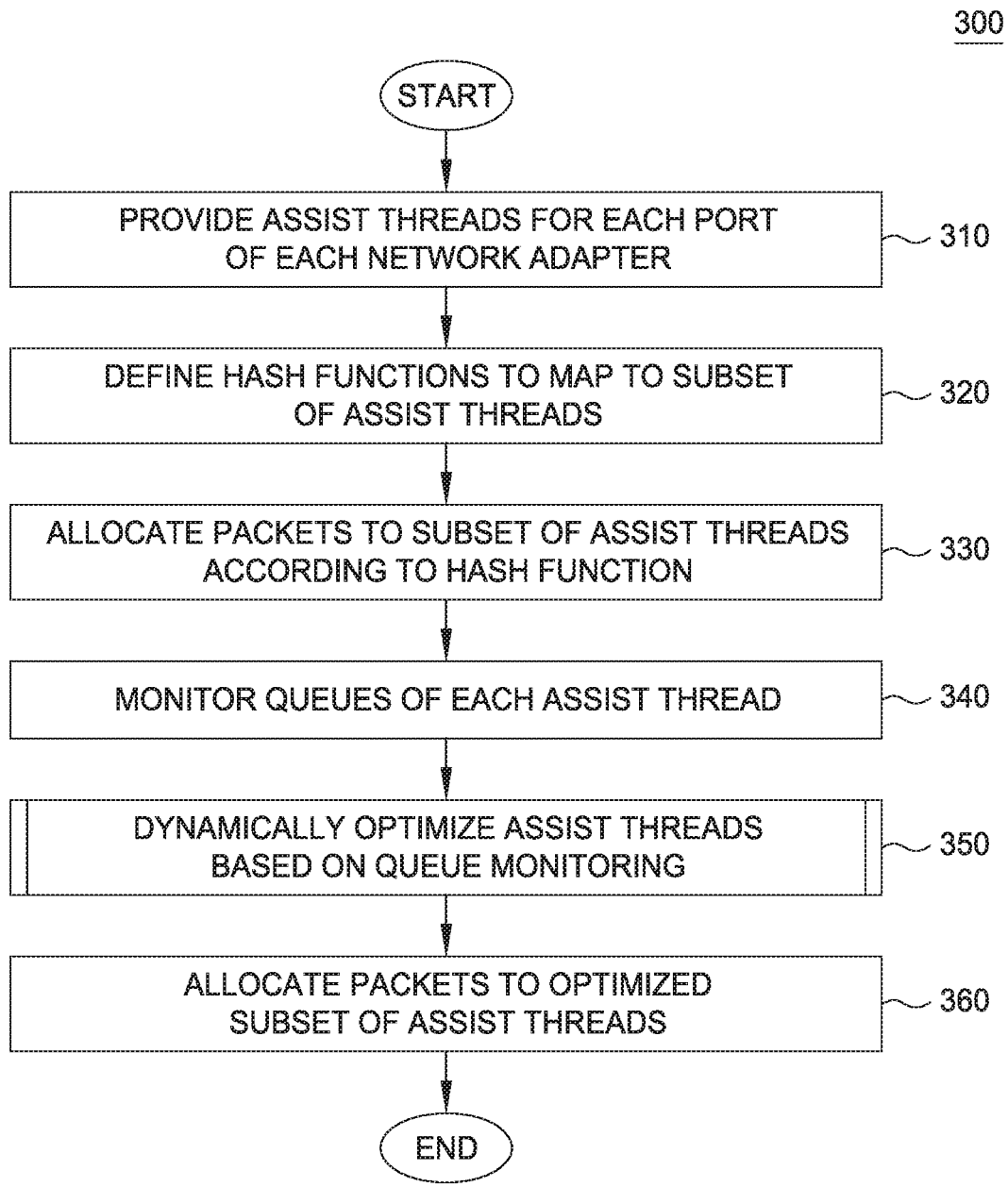
FIG. 3 is a flow chart illustrating a method to provide dynamically optimized device driver protocol assist threads, according to one embodiment.

FIG. 3 is a flow chart illustrating a method 300 to provide dynamically optimized device driver protocol assist threads, according to one embodiment. Generally, the method 300 provides a set number of assist threads that are available to process data units received by a network adapter, but dynamically optimize the number of assist threads that actually process network data based on the amount of network traffic at a given time, while the remainder of assist threads remain active but do not process data.

As shown, the method 300 begins at block 310, where a group of assist threads 103 are deployed for each port 110 of each network adapter 101 in a given system. Generally, any number of assist threads 103 may be initially provided for each port of each network adapter, and may be based on predefined initial values. In at least one embodiment, at least one assist thread per port is provided for each virtual processor in a virtualized platform. Each assist thread 103 deployed at block 310 is active, however, only a subset of the assist threads 103 initially process data units received through the respective port 110. The initial size of the subset of each group of assist threads that processes data units may be set to any size, and may be based on predefined initial values. At block 320, an initial hash function 105 is defined for each group of assist threads deployed at block 310. Generally, the hash functions 105 map data values to a respective subset of each group of assist threads deployed for a given port. The hash function 105 may be based on any attribute of data units, such as source IP address plus a port number, and may further divide the result based on the number of assist threads in the subset for the group of assist threads. As previously indicated, any suitable hash function 105 that maps to a set of hash values may be used, where each assist thread currently in the subset is associated with one hash value of the hash function. At block 330, the device driver 102 may apply the appropriate hash function to data units received by the network adapters to allocate each received packet to assist threads of the subset of assist threads 103 associated with the respective ports/network adapters.

At block 340, a monitor thread 104 may monitor the queues 106 of each assist thread 103. The monitor thread may poll each assist thread 103 for the current queue size, or may directly determine the size of each queue. At block 350, the assist threads 103 may be dynamically optimized based on the monitoring of queue sizes. For example, if the queue sizes indicate that the assist threads are saturated due to a spike in network traffic, the monitor thread 104 may add idle yet active assist threads to the subset of assist threads 103 that are processing data units. Doing so provides more assist threads 103 to process data units during times of high network traffic. Similarly, if the queue sizes are low, indicating a slow period of network traffic, the monitor thread 104 may remove one or more assist threads from the subset of assist threads that are currently processing data units. Doing so promotes optimal use of the assist threads 103 by providing more consistent levels of data units for each assist thread 103 to process, rather than having many threads processing relatively small numbers of data units. At block 360, the device driver 103 may allocate data packets received from the network adapter to the optimized subset of assist threads 103. The method 300 may then loop between blocks 340-360 to continue to optimize the assist threads 103.

Figure 4:
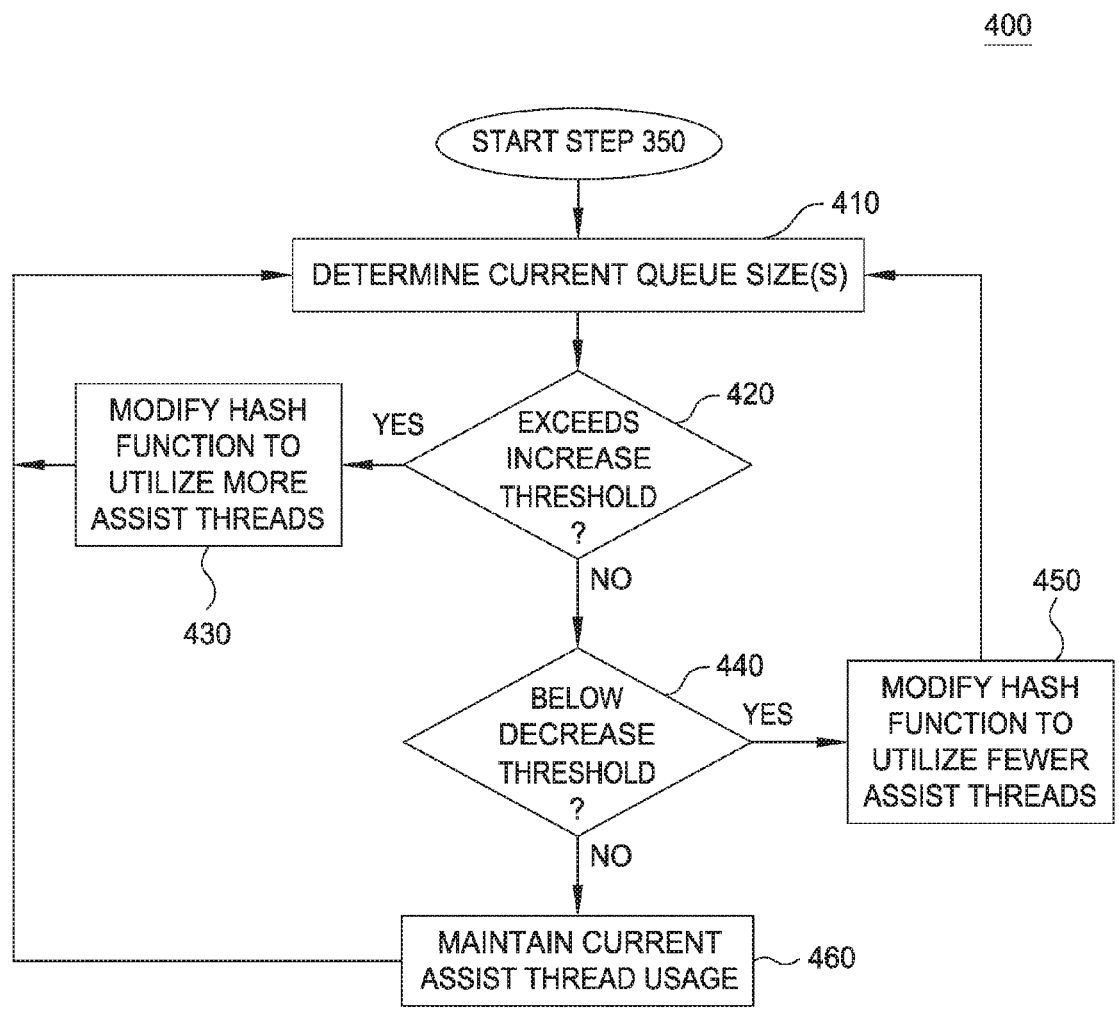
FIG. 4 is a flow chart illustrating a method to dynamically optimize assist threads based on queue monitoring, according to one embodiment.

FIG. 4 is a flow chart illustrating a method 400 corresponding to block 350 to dynamically optimize assist threads based on queue monitoring, according to one embodiment. Generally, the method 400 provides techniques to dynamically optimize assist threads based on the amount of network traffic experienced by a system at a given time. The device driver 102 and/or the monitor thread 104 may perform the method 400 for each group of assist threads deployed at block 310.

At block 410, the monitor thread 104 determines the current queue sizes for one or more assist threads 103 in a subset of assist threads 103 for a given port 110. At block 420, the monitor thread 104 determines whether at least one queue size (or the sum of all queue sizes) exceed a respective increase threshold. If the queue sizes (individually or collectively) exceed the increase threshold, the method proceeds to block 430. At block 430, the device driver 102 may modify the respective hash function 105 to utilize more assist threads 103. Stated differently, the device driver 103 may modify the hash function 105 to add at least one assist thread to the respective subset of assist threads that are processing data units. Doing so causes the newly added assist thread 103 to begin processing data units received by the network adapter, alleviating the loads experienced by other members of the subset. To add the at least one assist thread 103, the hash function 105 may be modified to map to the updated number of assist threads in the subset, where each hash value is associated with one assist thread in the subset of assist threads. In at least one embodiment, before modifying the hash function to utilize more assist threads, the device driver 102 may determine whether more assist threads 103 that can be activated. In such embodiments, if the device driver 102 determines that additional assist threads are not available, the device driver 102 may start one or more new assist threads 103, and activate these new threads in the hash function 105, such that the hash function 105 maps to these new threads. Therefore, in such embodiments, the number of assist threads provided in block 310 is not fixed, and may be increased or decreased as needed. The method may then return to block 410, where after a predetermined period of time, the monitor thread 104 may again determine the current sizes of each queue.

Returning to block 420, if the current queue sizes do not exceed the increase threshold (individually or collectively), the method proceeds to block 440. At block 440, the monitor thread 104 determines whether the current queue sizes (individually or collectively for the current subset of assist threads) are below a decrease threshold. In at least one embodiment, the increase threshold and the decrease threshold are the same. In still other embodiments, the increase threshold and the decrease threshold are different.

If the current queue sizes are not below the decrease threshold (individually or collectively), data traffic rates are too high to quiesce assist threads, and the method proceeds to block 460, where current assist thread usage is maintained. The method may then return to block 410, where after a predetermined period of time, the monitor thread 104 may again determine the current sizes of each queue.

Returning to block 440, if the current queue sizes are below the decrease threshold (individually or collectively), data traffic rates have reduced sufficiently, and the method proceeds to block 450. At block 450, the device driver and/or the monitor thread 104 may modify the hash function to utilize fewer assist threads. Stated differently, at least one assist thread 103 may be removed from the subset of assist threads 103. To remove the at least one assist thread 103, the hash function 105 may be modified to map to a fewer number of hash values, where each hash value is associated with one assist thread in the subset of assist threads. The method may then return to block 410, where after a predetermined period of time, the monitor thread 104 may again determine the current sizes of each queue.

Figure 5:
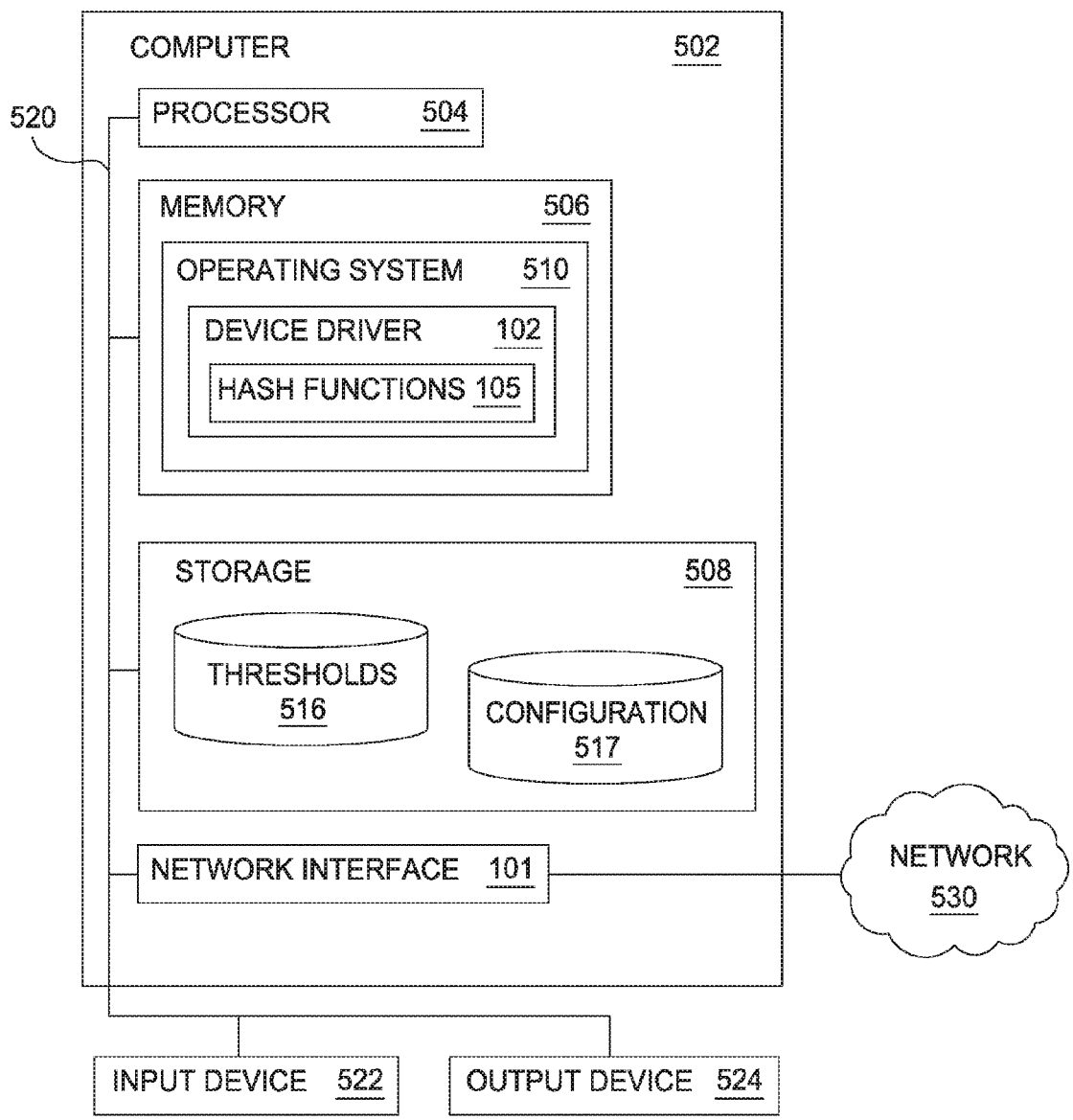
FIG. 5 is a block diagram illustrating a system which provides dynamically optimized device driver protocol assist threads, according to one embodiment.

FIG. 5 is a block diagram illustrating a system 500 which provides dynamically optimized device driver protocol assist threads, according to one embodiment. The networked system 500 includes a computer 502. The computer 502 may also be connected to other computers via a network 530. In general, the network 530 may be a telecommunications network and/or a wide area network (WAN). In a particular embodiment, the network 530 is the Internet.

The computer 502 generally includes a processor 504 which obtains instructions and data via a bus 520 from a memory 506 and/or a storage 508. The computer 502 may also include one or more network interface devices 101, input devices 522, and output devices 524 connected to the bus 520. The computer 502 is generally under the control of an operating system 510. Examples of operating systems include versions of the UNIX operating system (such as AIX), versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 101 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the computer 502. In addition, the memory 506 and the storage 508 may be considered to include memory physically located elsewhere; for example, on another computer coupled to the computer 502 via the bus 520 or the network 530.

The input device 522 may be any device for providing input to the computer 502. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on.

As shown, the memory 506 contains the device driver 102. As described in greater detail above, the device driver 102 provides the assist threads 103 and monitor threads 104.

The device driver 102 is configured to optimize the number of assist threads 103 that currently process data units received by the network adapter based on the amount of traffic received by the network adapter. Generally, the computer 502 incorporates all of the functionality described with respect to the systems, methods, and apparatuses of FIGS. 1-4.

As shown, the storage 508 contains a threshold store 516 and a configuration store 517. The thresholds 516 includes values, such as numbers of data units (e.g., packets, messages, frames) that if met by the queues 106 of the assist threads 103, result in removing or adding assist threads to the subset of assist threads 103 that process data units at a given time. The thresholds 516 may be specific to a port, network adapter, or system. A given port may have multiple levels of thresholds. The configuration 517 may include default values for the number of assist threads 103 initially allocated to a given port (or virtual machine utilizing the port) as well as the initial size of a subset of assist threads for a given port (or virtual machine utilizing the port).

Advantageously, embodiments disclosed herein allocate data units to an optimal number of assist threads based on the current rates of network traffic. By maintaining all assist threads active, embodiments disclosed herein avoid the overhead of putting assist threads to sleep and subsequently waking the assist threads up (possibly only to process a limited amount of traffic). Furthermore, embodiments disclosed herein optimize assist thread performance by allocating data units to an optimal number of assist threads. Doing so further optimizes overall system performance by reserving processor cycles for other system tasks that would otherwise be wasted by starting/stopping assist threads or inefficient processing of few numbers of data units by assist threads during times of slow network traffic.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
providing a plurality of active assist threads configured to process data units received by a network adapter, wherein each of the plurality of active assist threads comprises a queue configured to store data units allocated to the respective active assist thread;
allocating data units received by the network adapter to active assist threads in a subset of the plurality of active assist threads according to a first function, wherein the subset includes a first active assist thread and does not include a second active assist thread, of the plurality of active assist threads, wherein the second active assist thread is idle;
monitoring the queues of the assist threads in the subset; and
upon determining that a count of data units in the queue of the first active assist thread exceeds a first threshold, modifying the first function to include the second active assist thread in the subset of the plurality of active assist threads, wherein modifying the first function causes the first and second active assist threads to process data units subsequently received by the network adapter.

2. The method of claim 1, further comprising:
subsequent to modifying the first function:
allocating data units received by the network adapter to the active assist threads in the subset according to the first function;
monitoring the queues of the active assist threads in the subset;
determining that a count of data units in the queue of the first active assist thread falls below a second threshold; and
modifying the first function to remove at least one of the active assist threads from the subset.

3. The method of claim 2, wherein the plurality of active assist threads are provided by a device driver for the network adapter, wherein a monitor thread of the device driver is configured to monitor the queues.

4. The method of claim 3, wherein the first function comprises a hash function, wherein the hash function maps to one of the active assist threads in the subset, wherein the hash function operates on a source internet protocol (IP) address and a port specified in each data unit to allocate data units to one of the active assist threads in the subset.

5. The method of claim 4, wherein each of the plurality of active assist threads are dispatched to a processor, wherein data units are allocated only to active assist threads that are members of the subset, wherein a size of the subset of the plurality of active assist threads is based on an amount of traffic and a rate of traffic received by the network adapter.

6. The method of claim 5, wherein the plurality of active assist threads are associated with a first physical port of the network adapter, wherein the network adapter comprises a plurality of physical ports including the first physical port, wherein a computing system comprises a plurality of network adapters including the first network adapter, wherein a respective hash function and a respective plurality of active assist threads are provided for each physical port of each network adapter.

7. The method of claim 6, wherein the respective hash function associated with the respective physical port of the respective network adapter is used to allocate data units received by the respective physical port to a respective subset of the plurality of active assist threads associated with the respective physical port of the respective network adapter.

8. A system, comprising:
a processor; and
a memory containing a program which when executed by the processor performs an operation comprising:
providing a plurality of active assist threads configured to process data units received by a network adapter, wherein each of the plurality of active assist threads comprises a queue configured to store data units allocated to the respective active assist thread;
allocating data units received by the network adapter to active assist threads in a subset of the plurality of active assist threads according to a first function, wherein the subset includes a first active assist thread and does not include a second active assist thread, of the plurality of active assist threads, wherein the second active assist thread is idle;
monitoring the queues of the assist threads in the subset; and
upon determining that a count of data units in the queue of the first active assist thread exceeds a first threshold, modifying the first function to include the second active assist thread in the subset of the plurality of active assist threads, wherein modifying the first function causes the first and second active assist threads to process data units subsequently received by the network adapter.

9. The system of claim 8, the operation further comprising:
subsequent to modifying the first function:
allocating data units received by the network adapter to the active assist threads in the subset according to the first function;
monitoring the queues of the active assist threads in the subset;
determining that a count of data units in the queue of the first active assist thread falls below a second threshold; and
modifying the first function to remove at least one of the active assist threads from the subset.

10. The system of claim 9, wherein the plurality of active assist threads are provided by a device driver for the network adapter, wherein a monitor thread of the device driver is configured to monitor the queues.

11. The system of claim 10, wherein the first function comprises a hash function, wherein the hash function maps to one of the active assist threads in the subset, wherein the hash function operates on a source internet protocol (IP) address and a port specified in each data unit to allocate data units to one of the active assist threads in the subset.

12. The system of claim 11, wherein each of the plurality of active assist threads are dispatched to the processor, wherein data units are allocated only to active assist threads that are members of the subset, wherein a size of the subset of the plurality of active assist threads is based on an amount of traffic and a rate of traffic received by the network adapter.

13. The system of claim 12, wherein the plurality of active assist threads are associated with a first physical port of the network adapter, wherein the network adapter comprises a plurality of physical ports including the first physical port, wherein a computing system comprises a plurality of network adapters including the first network adapter, wherein a respective hash function and a respective plurality of active assist threads are provided for each physical port of each network adapter.

14. The system of claim 13, wherein the respective hash function associated with the respective physical port of the respective network adapter is used to allocate data units received by the respective physical port to a respective subset of the plurality of active assist threads associated with the respective physical port of the respective network adapter.

15. A computer program product, comprising:
a computer-readable storage medium having computer-readable program code embodied therewith, the computer-readable program code executable by a computer processor to perform an operation comprising:
providing a plurality of active assist threads configured to process data units received by a network adapter, wherein each of the plurality of active assist threads comprises a queue configured to store data units allocated to the respective active assist thread;
allocating data units received by the network adapter to active assist threads in a subset of the plurality of active assist threads according to a first function, wherein the subset includes a first active assist thread and does not include a second active assist thread, of the plurality of active assist threads, wherein the second active assist thread is idle;
monitoring the queues of the assist threads in the subset; and
upon determining that a count of data units in the queue of the first active assist thread exceeds a first threshold, modifying the first function to include the second active assist thread in the subset of the plurality of active assist threads, wherein modifying the first function causes the first and second active assist threads to process data units subsequently received by the network adapter.

16. The computer program product of claim 15, the operation further comprising:
subsequent to modifying the first function:
allocating data units received by the network adapter to the active assist threads in the subset according to the first function;
monitoring the queues of the active assist threads in the subset;
determining that a count of data units in the queue of the first active assist thread falls below a second threshold; and
modifying the first function to remove at least one of the active assist threads from the subset.

17. The computer program product of claim 16, wherein the plurality of active assist threads are provided by a device driver for the network adapter, wherein a monitor thread of the device driver is configured to monitor the queues.

18. The computer program product of claim 17, wherein the first function comprises a hash function, wherein the hash function maps to one of the active assist threads in the subset, wherein the hash function operates on a source internet protocol (IP) address and a port specified in each data unit to allocate data units to one of the active assist threads in the subset.

19. The computer program product of claim 18, wherein each of the plurality of active assist threads are dispatched to the processor, wherein data units are allocated only to active assist threads that are members of the subset, wherein a size of the subset of the plurality of active assist threads is based on an amount of traffic and a rate of traffic received by the network adapter.

20. The computer program product of claim 16, wherein the plurality of active assist threads are associated with a first physical port of the network adapter, wherein the network adapter comprises a plurality of physical ports including the first physical port, wherein a computing system comprises a plurality of network adapters including the first network adapter, wherein a respective hash function and a respective plurality of active assist threads are provided for each physical port of each network adapter, wherein the respective hash function associated with the respective physical port of the respective network adapter is used to allocate data units received by the respective physical port to a respective subset of the plurality of active assist threads associated with the respective physical port of the respective network adapter.

* * * * *